United States Patent
Kawashima et al.

(10) Patent No.: US 10,097,127 B2
(45) Date of Patent: Oct. 9, 2018

(54) THRUST CONSTANT DERIVATION METHOD AND MOVEMENT CONTROL METHOD OF LINEAR MOTOR, AND THRUST CONSTANT DERIVATION DEVICE AND MOVEMENT CONTROL DEVICE OF LINEAR MOTOR

(71) Applicant: FUJI CORPORATION, Chiryu (JP)

(72) Inventors: Hiroki Kawashima, Chiryu (JP); Ryo Nagata, Okazaki (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 15/102,543

(22) PCT Filed: Dec. 20, 2013

(86) PCT No.: PCT/JP2013/084269
§ 371 (c)(1),
(2) Date: Jun. 8, 2016

(87) PCT Pub. No.: WO2015/092917
PCT Pub. Date: Jun. 25, 2015

(65) Prior Publication Data
US 2016/0315574 A1    Oct. 27, 2016

(51) Int. Cl.
*H02K 41/00* (2006.01)
*H02P 25/064* (2016.01)
(Continued)

(52) U.S. Cl.
CPC ......... *H02P 25/064* (2016.02); *H02K 41/031* (2013.01); *H02P 6/006* (2013.01); *H02P 2205/05* (2013.01)

(58) Field of Classification Search
CPC .. H02K 41/03; H02K 41/031; H02K 2201/18; B60L 15/005; B60L 2200/26; Y02T 10/642; Y02T 10/7005
(Continued)

(56) References Cited

U.S. PATENT DOCUMENTS

| | | |
|---|---|---|
| 5,666,038 A | 9/1997 | Ohishi |
| 6,671,637 B2 * | 12/2003 | Shinohira ............... G01R 31/34 |
| | | 318/561 |

(Continued)

FOREIGN PATENT DOCUMENTS

| | | |
|---|---|---|
| EP | 0 632 568 A1 | 1/1995 |
| JP | 9-65511 A | 3/1997 |

(Continued)

OTHER PUBLICATIONS

International Search Report dated Feb. 4, 2014 in PCT/JP2013/084269 filed Dec. 20, 2013.
(Continued)

*Primary Examiner* — Rina Duda
(74) *Attorney, Agent, or Firm* — Oblon, McClelland, Maier & Neustadt, L.L.P.

(57) ABSTRACT

A method of deriving a thrust constant representing an occurrence rate of a thrust in relation to a current in a linear motor which includes a magnet extending in a movement direction, and a moving body which includes a coil mounted to a track member in a movable manner, the linear motor generating a thrust in the movement direction between the magnet and the coil by causing the current to flow in the coil, in which an average thrust constant which is an average thrust constant in a long movement zone on the track member is derived based on actual measurement, local thrust constants which are local thrust constants of a plurality of locations on the track member are derived based on (Continued)

each actual measurement, and the thrust constants are derived based on the average thrust constant and the local thrust constant of each location.

9 Claims, 9 Drawing Sheets

(51) Int. Cl.
*H02K 41/03* (2006.01)
*H02P 6/00* (2016.01)

(58) Field of Classification Search
USPC .................................................. 318/135, 687
See application file for complete search history.

(56) References Cited

U.S. PATENT DOCUMENTS

| | | | |
|---|---|---|---|
| 6,700,231 B2* | 3/2004 | Takamune | B23B 31/26 310/20 |
| 6,998,812 B2 | 2/2006 | Kerner et al. | |
| 7,005,810 B2* | 2/2006 | Ueda | F04B 35/045 318/114 |
| 7,672,741 B2* | 3/2010 | Ohnishi | G05B 19/19 700/19 |
| 7,768,156 B2* | 8/2010 | Ito | G03F 7/70758 310/12.06 |
| 8,344,669 B1 | 1/2013 | Gadda | |
| 2004/0100219 A1 | 5/2004 | Kerner et al. | |
| 2006/0170888 A1 | 8/2006 | Asano | |
| 2010/0310994 A1* | 12/2010 | Asano | G03B 27/58 430/325 |
| 2013/0257336 A1 | 10/2013 | Gadda | |

FOREIGN PATENT DOCUMENTS

| | | |
|---|---|---|
| JP | 2006-26750 A | 2/2006 |
| JP | 2006-211873 A | 8/2006 |
| JP | 2008-131762 A | 6/2008 |
| JP | 2009-159741 A | 7/2009 |
| JP | 2009-159751 A | 7/2009 |
| JP | 2010-63343 A | 3/2010 |
| JP | 2010-130854 A | 6/2010 |
| JP | 2010-207038 A | 9/2010 |

OTHER PUBLICATIONS

Extended European Search Report dated Dec. 21, 2016 in Patent Application No. 13899693.9.
Office Action dated Jul. 26, 2017 in Japanese Patent Application No. 2015-553301 (with English language translation).
Office Action dated Apr. 20, 2018 in European Patent Application No. 13899693.9.
Office Action dated May 4, 2018 in Chinese Application No. 201380081715.8, along with an English translation.

* cited by examiner

THRUST CONSTANT DERIVATION METHOD AND MOVEMENT CONTROL METHOD OF LINEAR MOTOR, AND THRUST CONSTANT DERIVATION DEVICE AND MOVEMENT CONTROL DEVICE OF LINEAR MOTOR

TECHNICAL FIELD

The present disclosure relates to a linear motor in which a moving body moves along a track member due to a thrust which is generated between a coil with a current running therethrough and a magnet. More specifically, the present disclosure relates to a method and a device which derive a thrust constant which changes depending on the position of the moving body, and to a method and a device which control the movement of the moving body using the derived thrust constant.

BACKGROUND ART

A solder printer, a component mounting machine, a reflow furnace, a board inspection machine, and the like are examples of equipment which manufacture a printed circuit board onto which multiple electronic components are mounted. Such equipment is generally connected by board conveyance devices to construct a board production line. In the component mounting machine or the board inspection machine, a feeding screw drive device has been used from the related art as a drive device of a mounting head or a testing head. In recent years, demand for high speed movement and high precision positional control of a head has increased, and a linear motor is used as the drive device. A linear motor is not limited to use in component mounting machines and board inspection machines, and is widely used in various industrial machines which include linear motion capable sections.

In such a type of linear motor, it is understood that the positional dependency of the thrust constant which is a detail of the motor characteristics influences the control characteristics. The thrust constant is an index representing the occurrence rate of thrust in relation to the current which is supplied to the coil, and is represented by the unit N/A (Newtons/Amperes). For example, in a certain linear motor control system, when the thrust constant drops by approximately 10% depending on the position of the moving body on the track member, it is confirmed that the required time until the moving body reaches the target position is lengthened by approximately 10 ms during the movement control.

Individual differences in strength and size of each magnet, variation in the arrangement positions of the magnets which are lined up, and the like are conceivable as change factors with which the thrust constant changes depending on the position. It is possible to reduce the influence of the change factors by decreasing tolerances in component management and assembly work management in the manufacturing process. However, decreasing tolerances of the management links directly to the demerit of an increase in costs. In such a situation, a technique is generally used in which the change amount of the thrust constant is derived based on actual measurement, the control parameters are adjusted variably during the movement control, and the control performance is improved. Examples of techniques which derive the thrust constant based on actual measurement and use the thrust constant in the movement control are disclosed in PTLs 1 to 4.

A multi-phase linear motor drive device of claim 1 of PTL 1 is provided with a table referencing means which includes a reference table in which thrust change information at each position of a movable element (a moving body) is stored, and which sequentially references the reference table during driving. In claim 2 of PTL 1, a mode is disclosed in which a linear motor is driven at a substantially fixed velocity and a reference table is created based on a time series of state amounts which are obtained at this time. Accordingly, it is possible to drive the linear motor while sequentially referencing thrust change information at each position in the drive direction, and drive control which is stable and has sufficiently reduced control deviation is performed.

The techniques of PTLs 2 to 4 have commonality in that thrust ripple is expressed by a Fourier series. A thrust ripple measurement device of a linear motor of PTL 2 is configured to include a phase calculator which calculates the phase of the Fourier fundamental frequency based on the position of the linear motor, and a parameter determining device which determines ripple parameters based on the phase and a thrust instruction. Accordingly, by controlling the linear motor to move at a fixed velocity and calculating the ripple parameters based on the thrust instruction and the position of the linear motor, it is possible to measure the thrust ripple with high precision. A thrust ripple compensation device of PTL 3 and PTL 4 discloses a device which performs movement control using the thrust ripple which is measured in PTL 2.

CITATION LIST

Patent Literature

PTL 1: JP-A-9-65511
PTL 2: JP-A-2009-159741
PTL 3: JP-A-2009-159751
PTL 4: JP-A-2010-130854

SUMMARY

Incidentally, in PTL 1 and PTL 2, the thrust constant change is derived based on the actual measurement results when the moving body is moved at a fixed velocity, and this is preferable in that it is possible to handle individual differences and positional dependency of the linear motor. However, in the derivation using only actual measurement at a certain fixed velocity, it is not necessarily possible to obtain a thrust constant of sufficient precision. In a general thrust constant derivation method, the moving body is moved at a fixed acceleration, and the relationship between the thrust which is generated at this time and the current which flows in the coil is obtained. Here, regardless of whether the actual measurement conditions are of a fixed velocity or a fixed acceleration, a friction resistance between the moving body and the track member becomes an error factor when deriving the thrust constant which depends on the position. There are many cases in which the size of the friction resistance changes nonlinearly depending on the velocity of the moving body. Therefore, it is preferable to quantitatively ascertain the influence of the friction resistance and reflect the influence on the derivation of the thrust constant.

The present disclosure was made in light of the problems of the background technology described above, and aims to solve the problem of providing a thrust constant derivation method and a thrust constant derivation device of a linear motor which performs actual measurement under a plurality of actual measurement conditions and has higher thrust constant derivation precision than the related art. Furthermore, the present invention aims to solve the problem of providing a movement control method and a movement control device of a linear motor with higher prevision movement control of a moving body than the related art by using the derived thrust constant.

The disclosure of a thrust constant derivation method of a linear motor according to an aspect which solves the problems described above is a method of deriving a thrust constant representing an occurrence rate of a thrust in relation to a current in a linear motor which is provided with a track member which includes one of a magnet and a coil extending in a movement direction, and a moving body which includes the other of the magnet and the coil mounted to the track member in a movable manner, the linear motor generating a thrust in the movement direction between the magnet and the coil by causing a current to flow in the coil, in which an average thrust constant which is an average thrust constant in a long movement zone on the track member is derived based on actual measurement, local thrust constants which are local thrust constants of a plurality of locations on the track member are derived based on each actual measurement, and the thrust constants of arbitrary positions on the track member are derived based on the average thrust constant and the local thrust constant of each location.

Accordingly, by performing the actual measurement under a plurality of actual measurement conditions, it is possible to derive the average thrust constant in the long movement zone on the track member, and it is possible to derive the local thrust constant at each of the plurality of locations on the track member. It is possible to quantitatively ascertain the friction resistance between the moving body and the track member by comparing the average thrust constant and the local thrust constants to each other and to reduce the influence thereof. Therefore, it is possible to increase the derivation precision of the thrust constant of an arbitrary position on the track member based on the actual measurement under the plurality of actual measurement conditions in comparison with the related art based on a single actual measurement condition.

The disclosure of a movement control method of one embodiment of a linear motor includes a thrust constant storage step of storing a thrust constant table in which a thrust constant is correlated with a positional coordinate of an arbitrary position on the track member which is derived using the thrust constant derivation method of the linear motor, and a thrust control step of detecting a current positional coordinate on the track member of the moving body when subjecting the moving body to movement control, and using the thrust constant corresponding to the current positional coordinate of the thrust constant table to control a current to be caused to flow in the coil.

Accordingly, the positional dependency of the thrust constant which has higher precision than the related art is stored in the thrust constant table, and it is possible to perform the movement control using the thrust constant corresponding to the current positional coordinate of the moving body. Therefore, the precision of the movement control of the moving body may be increased more than the related art.

The disclosure of a thrust constant derivation device of another embodiment of a linear motor is a device which derives a thrust constant representing an occurrence rate of a thrust in relation to a current in the linear motor which is provided with a track member which includes one of a magnet and a coil extending in a movement direction, and a moving body which includes other of the magnet and the coil mounted to the track member in a movable manner, the linear motor generating the thrust in the movement direction between the magnet and the coil by causing the current to flow in the coil, the device including a means for deriving an average thrust constant which is an average thrust constant in a long movement zone on the track member based on actual measurement, a means for deriving local thrust constants which are local thrust constants of a plurality of locations on the track member based on each actual measurement, and a means for deriving the thrust constants of arbitrary positions on the track member based on the average thrust constant and the local thrust constant of each location.

Accordingly, it is possible to carry out the thrust constant derivation method of the linear motor according to the present disclosure, and the same effects occur with the disclosed device.

The disclosure of a movement control device of a linear motor according to one aspect of the disclosure includes a thrust constant storage means for storing a thrust constant table in which a thrust constant is correlated with a positional coordinate of an arbitrary position on the track member which is derived using the thrust constant derivation method of the linear motor or the thrust constant derivation device of the linear motor according to another aspect of the disclosure, and a thrust control means for detecting a current positional coordinate on the track member of the moving body when subjecting the moving body to movement control, and using the thrust constant corresponding to the current positional coordinate of the thrust constant table to control a current to be caused to flow in the coil.

Accordingly, it is possible to carry out movement control method of the linear motor according to the present disclosure, and the same effects occur with the disclosed device.

DESCRIPTION OF EMBODIMENTS

Figure 1:
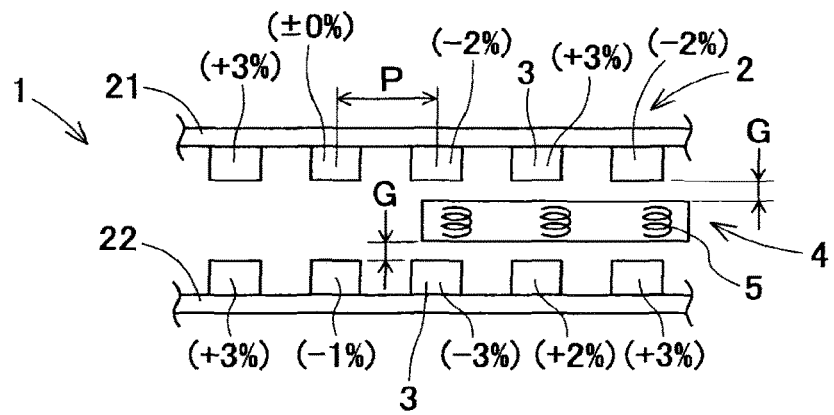
FIG. 1 is a plan diagram illustrating a basic configuration example of a linear motor, and also acts as a diagram schematically illustrating individual differences in strength of permanent magnets, which is a change factor of a thrust constant.

Description will be given of a thrust constant derivation method of a linear motor of the first embodiment of the present disclosure, with reference to FIGS. 1 to 17. First, description will be given of a basic configuration example of a linear motor 1 which is used in the first embodiment. FIG. 1 is a plan diagram illustrating a basic configuration example of the linear motor 1. The linear motor 1 is formed of a track member 2 and a moving body 4.

The track member 2 includes two long rails 21 and 22 which are arranged in parallel. The long rails 21 and 22 extend in the left-right direction of FIG. 2 which is the movement direction of the moving body 4. A plurality of permanent magnets 3 are provided to line up in the movement direction at a substantially fixed installation pitch P on the surfaces of the long rails 21 and 22 which face each other. FIG. 1 illustrates 10 of the permanent magnets 3, and a further multitude of the permanent magnets 3, which are omitted from the drawing, are provided to line up either side in the movement direction.

The moving body 4 is formed in a substantially rectangular parallelepiped shape which is long in the movement direction. A mounting-target portion (omitted from the drawings) of the moving body 4 is engaged with a mounting portion (omitted from the drawings) of the track member 2. Accordingly, the moving body 4 is mounted between the two long rails 21 and 22 of the track member 2 in a movable manner. The space between the moving body 4 and the permanent magnets 3 of both sides of the track member 2 is separated by a gap length G which is substantially uniform. The moving body 4 includes three coils 5 which are arranged to be separated by approximately the installation pitch P in the movement direction. Each of the coils 5 moves relative to the permanent magnets 3 of both sides while facing the permanent magnets 3 of both sides.

A position detection section, a movement control section, and a power source section which are omitted from the drawings are further installed in the moving body 4. The position detection section detects a current positional coordinate Xnow representing the current position of the moving body 4 on the track member 2. The movement control section variably controls the magnitude and the direction of a current I which flows in the coils 5 from the power source section based on the detected current positional coordinate Xnow and the movement instruction. Accordingly, a thrust F is generated in the movement direction between a current field which is formed by the coils 5 of the moving body 4 and a permanent field which is formed by the permanent magnets 3 of the track member 2.

The configuration of the track member 2 and the moving body 4 is not limited to that described above, and it is possible to adapt for use in various well-known techniques. For example, the moving body 4 may include four or more of the coils 5. For example, the coils 5 may be provided to line up in the track member 2, and the moving body 4 may include the permanent magnets 3. In either configuration, the magnitude of the thrust F changes depending on the strength of the permanent magnets 3 and the magnitude of the current I flowing in the coils 5.

Here, a thrust constant N (unit: N/A (Newtons/Amperes)) indicates the occurrence rate of the thrust F in relation to the current I. In other words, When a current of 1 A is allowed to flow in the coils 5, the thrust F which is generated between the track member 2 and the moving body 4 is the thrust constant N. In ideal conditions in which the permanent magnets 3 generate a uniform permanent field and there is no friction resistance R between the track member 2 and the moving body 4, the thrust F is a fixed value which does not depend on the current positional coordinate Xnow. However, in actuality, the thrust constant N changes depending on the position on the track member 2 according to the change factors of the permanent magnets 3 and the track member 2 which are exemplified in FIGS. 1 to 5. Since, in actuality, the friction resistance R is present, it is not possible to use all of the thrust F in the acceleration of the moving body 4.

FIG. 1 also acts as a diagram schematically illustrating the individual differences in the strength of the permanent magnets 3, which is a change factor of the thrust constant N. The 10 permanent magnets 3 which are exemplified in FIG. 1 have individual differences in the strength of the magnetic force which is indicates in percentage values in parenthesis. In the example of FIG. 1, when the average value of the strength of the magnetic force is set to ±0%, the individual differences are scattered in a range from to +3%. The thrust constant N increases in the vicinity of the permanent magnet 3 which has a relatively strong magnetic force, and decreases in the vicinity of the permanent magnet 3 which has a relatively weak magnetic force.

Figure 2:
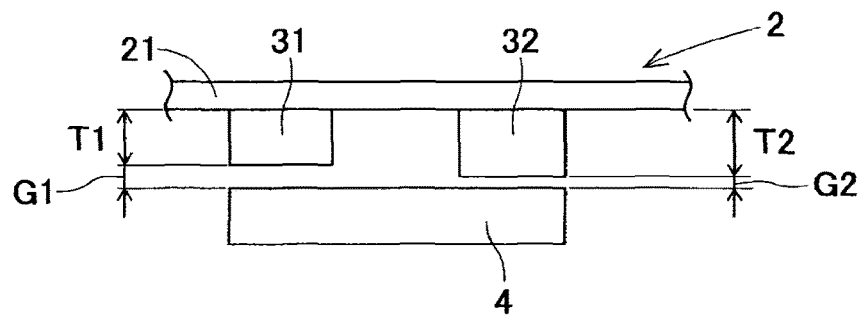
FIG. 2 is a diagram schematically illustrating individual differences in thickness of the permanent magnets, which is a change factor of the thrust constant.

FIG. 2 is a diagram schematically illustrating the individual differences in the thickness of the permanent magnets 3, which is a change factor of the thrust constant N. In the example of FIG. 2, a thickness T2 of a second permanent magnet 32 is greater than a thickness T1 of a first permanent magnet 31. Therefore, a gap length G2 between the second permanent magnet 32 and the moving body 4 is smaller than a gap length G1 between the first permanent magnet 31 and the moving body 4. Therefore, the thrust constant N decreases in the vicinity of the first permanent magnet 31 which has the large gap length G1, and increases in the vicinity of the second permanent magnet 32 which has the small gap length G2.

Figure 3:
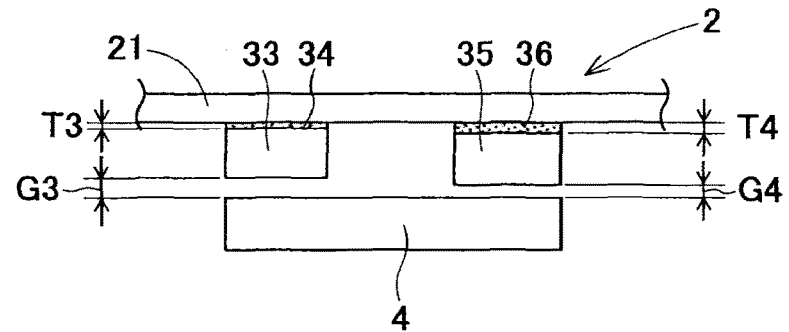
FIG. 3 is a diagram schematically illustrating individual differences in adhesive thickness of the permanent magnets, which is a change factor of the thrust constant.

FIG. 3 is a diagram schematically illustrating the individual differences in the adhesive thickness of the permanent magnets 3, which is a change factor of the thrust constant N. In the example of FIG. 3, a thickness T4 of an adhesive 36 which fixes a fourth permanent magnet 35 to the long rail 21 is greater than a thickness T3 of an adhesive 34 which fixes a third permanent magnet 33 to the long rail 21. Therefore, even if the thickness of the two permanent magnets 33 and 35 is the same, a gap length G4 of the fourth permanent magnet 35 side is smaller than a gap length G3 of the third permanent magnet 33 side. Therefore, the thrust constant N decreases in the vicinity of the third permanent magnet 33 which has the small thickness T3 of the adhesive 34, and increases in the vicinity of the fourth permanent magnet 35 which has the large thickness T4 of the adhesive 36.

Figure 4:
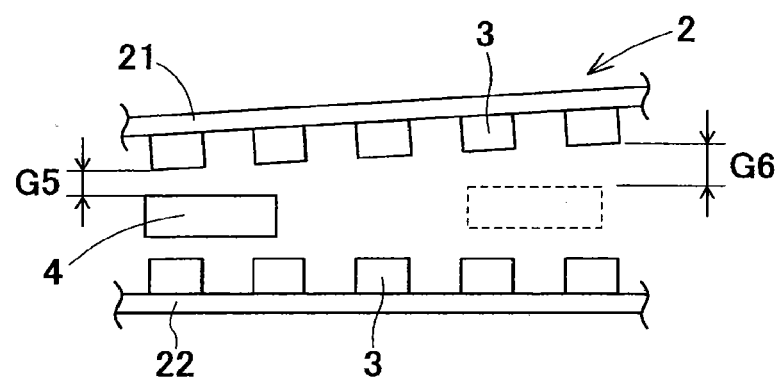
FIG. 4 is a diagram schematically illustrating the degree of parallelization of long rails, which is a change factor of the thrust constant.

FIG. 4 is a diagram schematically illustrating the degree of parallelization of long rails 21 and 22, which is a change factor of the thrust constant N. Ordinarily, since there is an error in the assembly precision of the two long rails 21 and 22, a concern remains that the degree of parallelization will be insufficient. In this case, the mutual distance between the two long rails 21 and 22 at one end and the other end changes as illustrated in FIG. 4. Accordingly, gap lengths G5 and G6 between the permanent magnets 3 and the moving body 4 change depending on the position, and the thrust constant N changes corresponding to the gap lengths G5 and G6.

Figure 5:
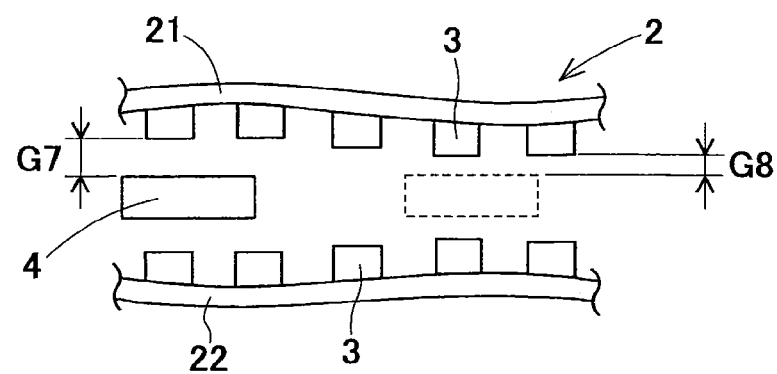
FIG. 5 is a diagram schematically illustrating the linearity of the long rails, which is a change factor of the thrust constant.

FIG. 5 is a diagram schematically illustrating the linearity of the long rails 21 and 22, which is a change factor of the thrust constant N. Ordinarily, since there is an error in the work precision of the two long rails 21 and 22, a concern remains that the linearity will be insufficient in at least one of the long rails 21 and 22. In this case, the mutual distance between the two long rails 21 and 22 changes depending on the position as illustrated in FIG. 5. Accordingly, gap lengths G7 and G8 between the permanent magnets 3 and the moving body 4 change depending on the position, and the thrust constant N changes corresponding to the gap lengths G7 and G8.

In FIGS. 1 to 5, in actuality, the individual differences in strength, size and the like of the plurality of permanent magnets 3 which the three coils 5 of the moving body 4 face and the gap lengths G are interrelated and change the thrust constant N. The Newtonian equation of motion (the second law) that "a thrust acting on an object is equal to the product of the mass of the object and the generated acceleration" is used in order to derive the thrust constant N based on the actual measurement. Here, not all of the thrust F is used in the acceleration of the moving body 4, and a portion of the thrust F is used for compensating the friction resistance R between the track member 2 and the moving body 4 by resisting the friction resistance R. There are many cases in which the magnitude of the friction resistance R changes nonlinearly depending on the velocity of the moving body 4 and the like, and this increases the difficulty of accurately deriving the thrust constant N.

Figure 6:
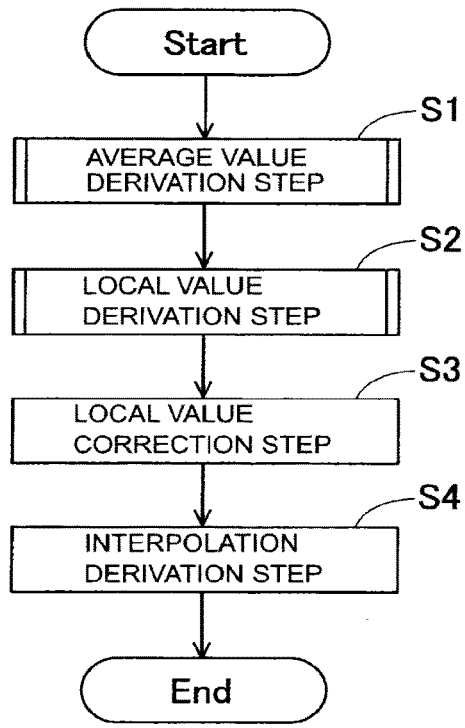
FIG. 6 is a flowchart illustrating a thrust constant derivation method of a linear motor of a first embodiment.
Figure 7:
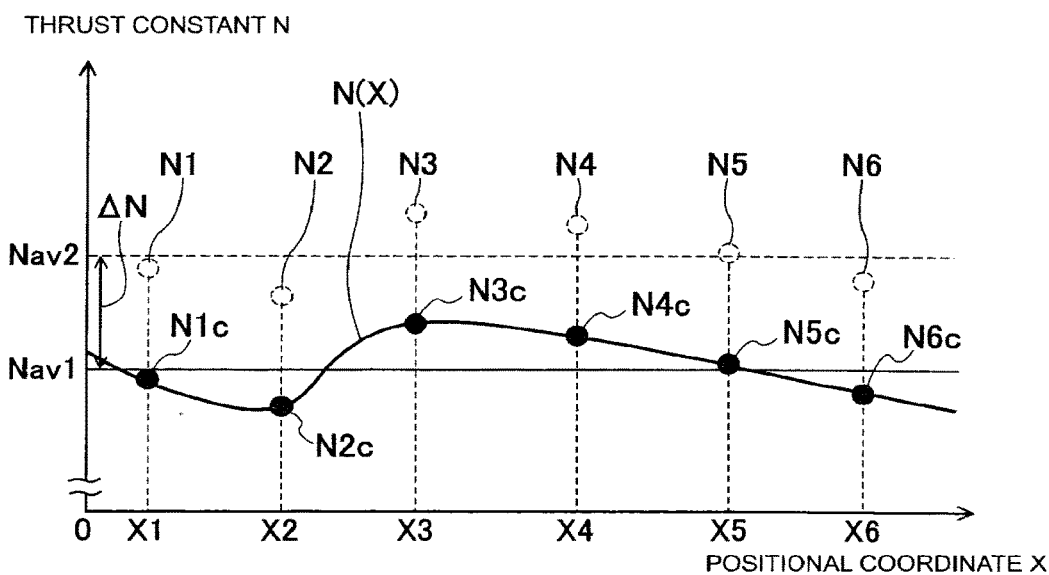
FIG. 7 is a diagram schematically illustrating a thrust constant derivation method of the linear motor of the first embodiment.

Therefore, in the thrust constant derivation method of the linear motor of the first embodiment, the actual measurement is performed under two types of actual measurement conditions, and the actual measurement results are combined to precisely derive the thrust constant N of an arbitrary position on the track member 2. FIG. 6 is a flowchart illustrating the thrust constant derivation method of the linear motor of the first embodiment. The thrust constant derivation method of the linear motor of the first embodiment carries out, in order, an average value derivation step S1, a local value derivation step S2, a local value correction step S3, and an interpolation derivation step S4. It is possible to carry out the thrust constant derivation method of the linear motor of the first embodiment by causing external digital measurement devices, data processing devices, and the like to cooperate, as appropriate, with the position detection section and the movement control section of the moving body 4. FIG. 7 is a diagram schematically illustrating the thrust constant derivation method of the linear motor of the first embodiment. In FIG. 7, the horizontal axis represents the positional coordinate X on the track member 2, and the vertical axis represents the thrust constant N.

First, description will be given of the overall procedure of the thrust constant derivation method, with reference to FIGS. 6 and 7. In the average value derivation step S1 of FIG. 6, the moving body 4 is moved along the long movement zone on the track member 2, and an average thrust constant Nav1 is derived based on actual measurement. By carrying out the detailed procedure described later, it is possible to derive the average thrust constant Nav1 representing the average thrust constant in the movement zone excluding the influence of the friction resistance R.

Next, in the local value derivation step S2, the moving body 4 is caused to perform a micro-movement in the movement direction at a plurality of locations on the track member 2, and the local thrust constant is derived at each of the locations. Local thrust constants N1 to N6 of six locations of positional coordinates X1 to X6 which are derived by carrying out the detailed procedure which is described in detail later are plotted in FIG. 7. The local thrust constants N1 to N6 receive the influence of the local change factors described in FIGS. 1 to 5, and change depending on the positional coordinates X1 to X6.

Next, in the local value correction step S3, an average value Nav2 of the local thrust constants N1 to N6 of the six locations is calculated, and a difference ΔN between the average value Nav2 and the average thrust constant Nav1 is calculated. It is possible to consider the difference ΔN exemplified in FIG. 7 as an error difference of the local thrust constants N1 to N6 largely caused by the influence of the friction resistance R. Therefore, the local thrust constants N1 to N6 of the six locations are corrected by the difference ΔN to obtain corrected thrust constants N1c to N6c of each location. In the example of FIG. 7, N1c=N1−ΔN, N2c=N2−ΔN, . . . , and N6c=N6−ΔN.

Next, in the interpolation derivation step S4, the thrust constant N(X) of an arbitrary positional coordinate X on the track member 2 is derived by interpolating the corrected thrust constants N1c to N6c of the six locations. It is possible to use various well-known interpolation equations such as, for example, a high dimension polynomial as the interpolation method. Accordingly, it is possible to derive the thrust constant N(X) with high precision reflecting the influence of the local change factors while excluding the influence of the friction resistance R. In the example of FIG. 7, the thrust constant N(X) is represented by a smooth interpolation curve which passes through the corrected thrust constants N1c to N6c of the six locations.

Figure 8:
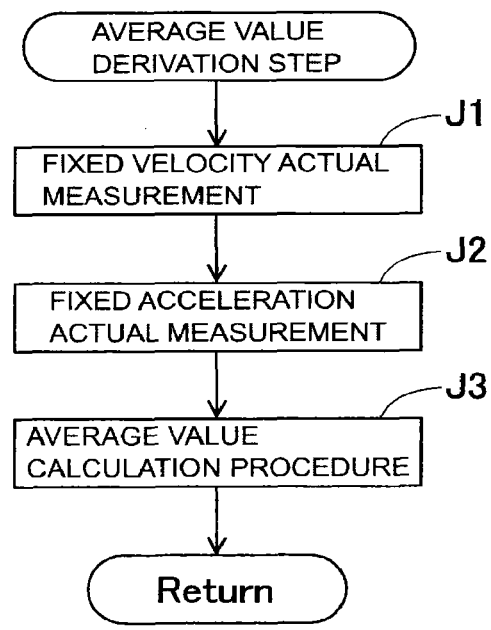
FIG. 8 is a flowchart illustrating the detailed procedure of an average value derivation step.

Next, description will be given of the detailed procedure of the average value derivation step S1. FIG. 8 is a flowchart illustrating the detailed procedure of the average value derivation step S1. In the average value derivation step S1, a fixed velocity actual measurement procedure J1, a fixed acceleration actual measurement procedure J2, and an average value calculation procedure J3 are performed in order.

Figure 9:
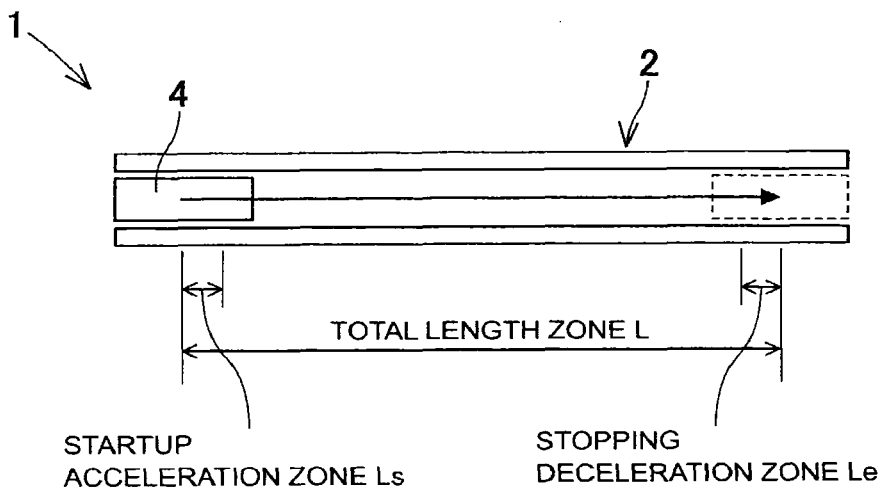
FIG. 9 is a diagram illustrating a movement zone in which to move a moving body when performing actual measurement in the average value derivation step.

FIG. 9 is a diagram illustrating a movement zone in which to move the moving body 4 when performing actual measurement in the average value derivation step S1. In the average value derivation step S1, it is preferable that the movement zone is long. In other words, it is preferable to set the movement zone to a total length zone L in which the moving body 4 is capable of moving on the track member 2, or, to set the movement zone to a zone obtained by subtracting a minimal startup acceleration zone Ls and a stopping deceleration zone Le from the total length zone L.

Figure 10:
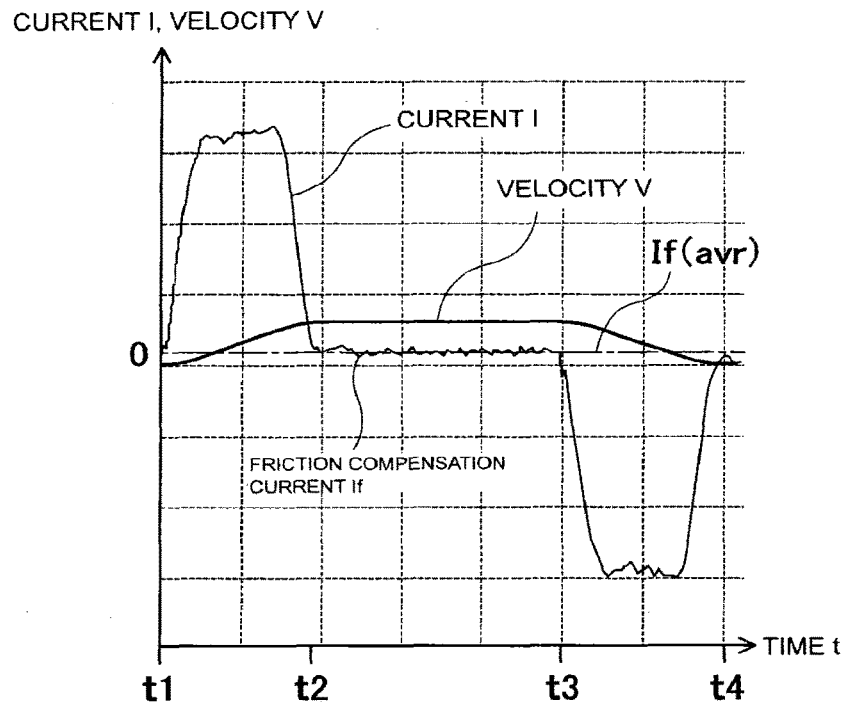
FIG. 10 is an actual measurement waveform example of a friction compensation current and a velocity in a fixed velocity actual measurement procedure during the average value derivation step.

In the fixed velocity actual measurement procedure J1, the moving body 4 is moved across the movement zone on the track member 2 at a fixed velocity V, and a friction compensation current If necessary for the compensation of the friction resistance R is subjected to actual measurement. FIG. 10 is an actual measurement waveform example of the friction compensation current If and the velocity V in the fixed velocity actual measurement procedure J1 during the average value derivation step S1. In FIG. 10, the horizontal axis represents time t, and the vertical axis represents the current I flowing in the coil 5 and the velocity V of the moving body 4. The direction of the current I flowing in the coil 5 is subjected to switch control according to the positional coordinate X of the moving body 4. Therefore, the current I which generates the thrust F of the forward direction of the moving body 4 is represented by a positive value, and the current I which generates the thrust F in the backward direction of the moving body 4 is represented by a negative value.

When the current I of a positive value starts to flow at a time t1, the moving body 4 moves in the startup acceleration zone Ls while accelerating. In the startup acceleration zone Ls, the current I of a large positive value flows for the acceleration. When the moving body 4 reaches the predetermined velocity V at a time t2, the startup acceleration zone Ls ends. Hereinafter, the current I is variably controlled to maintain the velocity V at a fixed velocity. The maintenance of the velocity V continues until the moving body 4 enters the stopping deceleration zone Le at a time t3. From the time t3 onward, the large current I of a negative value is caused to flow to control the movement of the moving body 4, and the moving body 4 stops at a time t4.

The current I of a time slot from the time t2 until the time t3 in which the velocity V is maintained is the friction compensation current If. Hypothetically, if the friction resistance R is not present, the friction compensation current If becomes zero; however, in actuality, since the friction resistance R is present, the friction compensation current If is necessary to a certain degree. As exemplified in FIG. 10, the friction compensation current If is substantially fixed in the movement zone. Even so, in a case in which a little variation is present, an average current value If(avr) exemplified by a dot-and-dash line in FIG. 9 is set to the friction compensation current If.

The fixed velocity V is set to a plurality (n types) of velocities Vf1, Vf2, . . . , and Vfn, and friction compensation currents If1, If2, . . . , and Ifn are subjected to actual measurement for each of the velocities. The friction compensation currents If1, If2, . . . , and Ifn change depends on the velocities Vf1, Vf2, . . . , and Vfn. The obtained actual measurement results are stored in a memory or the like by being rendered as a friction compensation table in which the velocities Vf1, Vf2, . . . , and Vfn are correlated with the friction compensation currents If1, If2, . . . , and Ifn. In the friction compensation table, it is preferable that the discreet relationships between the velocities Vf1, Vf2, . . . , and Vfn and the friction compensation currents If1, If2, . . . , and Ifn are interpolated, and a continuous relationship is obtained in advance.

In the next fixed acceleration actual measurement procedure J2, the moving body 4 is caused to move across the movement zone at a fixed acceleration A, and the acceleration required current Ia and the velocity V of the moving body 4 which are necessary at this time are subjected to actual measurement. The actual measurement may be performed continuously within the movement zone, or may be performed at multiple points even if the actual measurements are performed discreetly. The acceleration required current Ia and the velocity V change according to the positional coordinate X in the movement zone. Therefore, it is possible to represent the actual measurement results using a graph in which, for example, the horizontal axis is set to the time t or the positional coordinate X, and the vertical axis is set to the acceleration required current Ia and the velocity V. A portion of the acceleration required current Ia which is actually measured is used in the generation of the thrust F which causes the moving body 4 to accelerate, and the remaining portion is used for compensating the friction resistance R by resisting the friction resistance R.

Figure 11:
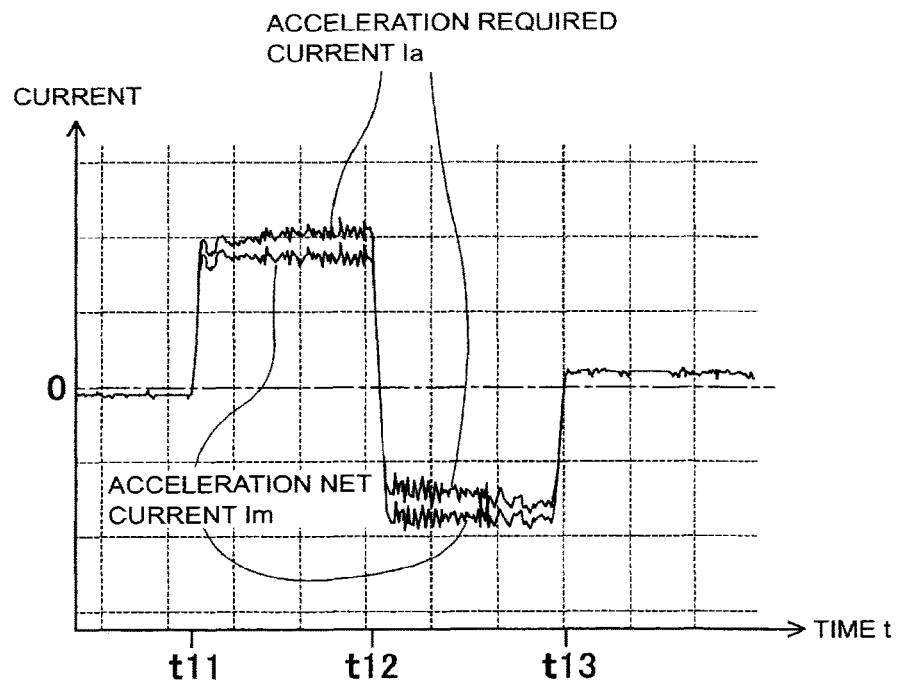
FIG. 11 is an actual measurement waveform example of an acceleration required current in a fixed acceleration actual measurement procedure during the average value derivation step, and is a waveform example of an acceleration net current which is calculated in an average value calculation procedure.

In the fixed acceleration actual measurement procedure J2, actual measurement conditions may be adopted in which the first half of the movement zone is the fixed acceleration A, and the latter half of the movement zone is the same magnitude of the opposite sign deceleration −A. In the actual measurement conditions, for example, the actual measurement results exemplified in FIG. 11 are obtained. FIG. 11 is an actual measurement waveform example of the acceleration required current Ia in the fixed acceleration actual measurement procedure J2 during the average value derivation step S1, and is a waveform example of the acceleration net current Im which is calculated in the average value calculation procedure J3. In FIG. 11, the horizontal axis represents the time t, and the vertical axis represents the acceleration required current Ia and the acceleration net current Im.

In the actual measurement waveform example of FIG. 11, from time t11 until time t12, the fixed acceleration A of the moving body 4 is maintained in the first half of the movement zone. The acceleration required current Ia during this period is a positive value and gradually increases while including a little variation. From time t12 until time t13, the fixed deceleration −A of the moving body 4 is maintained in the latter half of the movement zone. The acceleration required current Ia during this period is a negative value and the absolute value gradually increases while including a little variation.

In the next average value calculation procedure J3, the following calculation process is performed continuously or at multiple discreet points in the movement zone. First, the friction compensation current If corresponding to the velocity V of the moving body 4 which is actually measured in the fixed acceleration actual measurement procedure J2 is acquired from the friction compensation table. Secondly, the acceleration net current Im is calculated by subtracting the acquired friction compensation current If from the acceleration required current Ia. Therefore, the acceleration net current Im is the net current which is used in the generation of the thrust F. In the example of FIG. 11, the acceleration net current Im is a substantially fixed value for each of the first half and the latter half of the movement zone. Thirdly, the average thrust constant Nav1 is calculated based on the thrust F which is obtained from the acceleration A and the deceleration −A using the Newtonian equation of motion (the second law), and the calculated acceleration net current Im. The average thrust constant Nav1 is substantially fixed in the movement zone. In a case in which there is variation in the acceleration net current Im, the average thrust constant Nav1 is calculated by adopting the average acceleration net current in the movement zone.

In a case in which characteristic differences arise due to the reciprocal movement directions of the moving body 4, the actual measurement is performed in each of the outward movement direction and the return movement direction, and different average thrust constants Nav1 for the outward movement direction and the return movement direction may be calculated. In the fixed velocity actual measurement procedure J1 and the fixed acceleration actual measurement procedure J2, it is possible to increase the derivation precision by obtaining an average value by performing the actual movement of each of a plurality of times. Additionally, it is possible to modify the average value derivation step S1, as appropriate.

Figure 12:
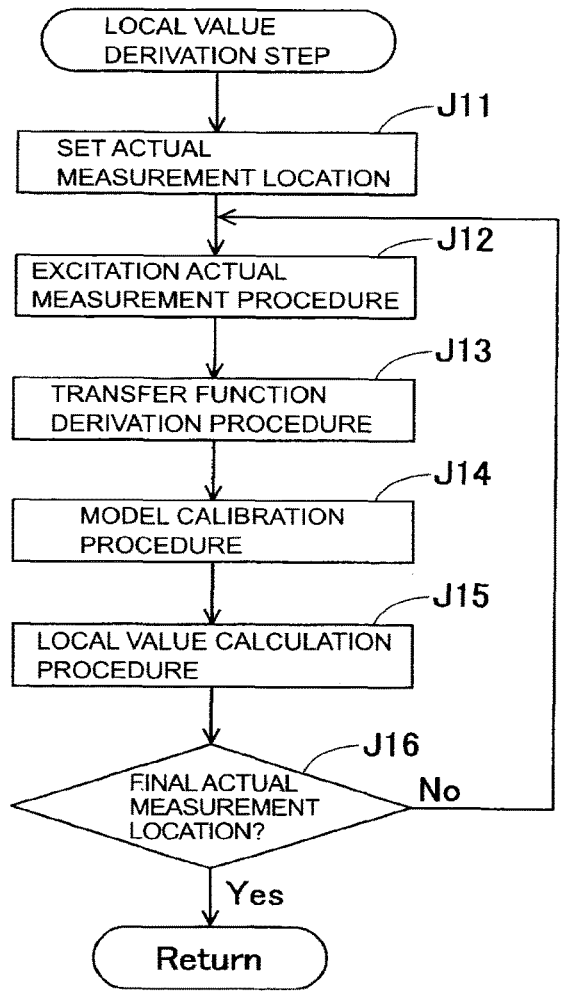
FIG. 12 is a flowchart illustrating the detailed procedure of a local value derivation step.

Next, description will be given of the detailed procedure of the local value derivation step S2. FIG. 12 is a flowchart illustrating the detailed procedure of the local value derivation step S2. In the local value derivation step S2, an excitation actual measurement procedure J12, a transfer function derivation procedure J13, a model calibration procedure J14, and a local value calculation procedure J15 are performed at each of a plurality of actual measurement locations on the track member 2. First, a plurality of actual measurement locations are set in procedure J11 of FIG. 12.

Figure 13:
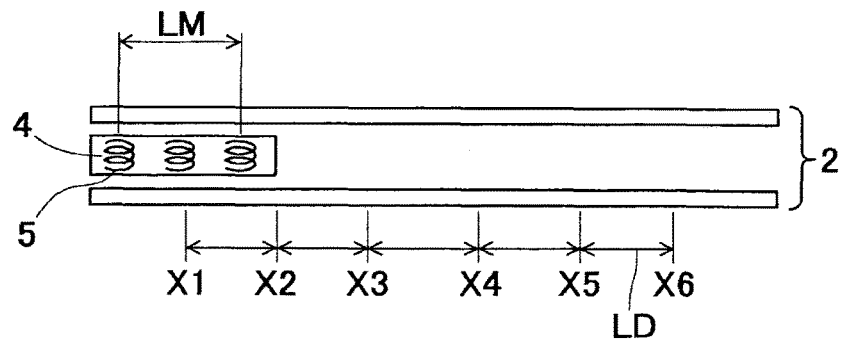
FIG. 13 is a diagram illustrating a setting example of a plurality of actual measurement locations on a track member for which the local thrust constants are to be derived.

FIG. 13 is a diagram illustrating a setting example of a plurality of actual measurement locations on the track member 2 for which the local thrust constants N1 to N6 are to be derived. As depicted in the drawings, three coils are provided to line up in an area of a predetermined length LM in the movement direction of the moving body 4. The actual measurement locations at which to derive the local thrust constants N1 to N6 are set on the track member 2 at an interval LD which is narrower than the predetermined length LM. FIG. 13 illustrates that six actual measurement locations corresponding to the positional coordinates X1 to X6 in FIG. 7 are set at the interval LD. The interval LD is not necessarily a uniform interval. A more narrow interval than the interval LD illustrated in FIG. 13 may be set.

By setting the interval LD to be narrow to a certain degree, the influence of the change factors of all of the permanent magnets 3 is reflected on at least one of the local thrust constants N1 to N6. Accordingly, the derivation precision of the thrust constant N is secured. When the interval LD is hypothetically set to be wider than the predetermined length LM, permanent magnets 3 which do not face the coils 5 arise to become a blind spot in the local value derivation step S2. In this case, since the change factors of the permanent magnets 3 which do not face the coils 5 are not reflected in the local thrust constants N1 to N6 even if the change factors are markedly small, a marked decrease in the derivation precision of the thrust constant N is a concern.

In the next excitation actual measurement procedure J12, first, the moving body 4 moves to the actual measurement location of the set positional coordinate X1. Next, the actual measurement of an alternating current Iac and the positional coordinate X of the moving body 4 is performed while exciting the moving body 4 forward and backward in the movement direction by causing the alternating current Iac with a variable frequency f to flow in the coils 5. In the first embodiment, the alternating current Iac which flows in the coils 5 is set to a sinusoidal current, and the high-speed sinusoidal sweeping method which gradually changes the frequency f chronologically is used. Accordingly, the actual measurement waveform examples illustrated in FIGS. 14 and 15 are obtained.

Figure 14:
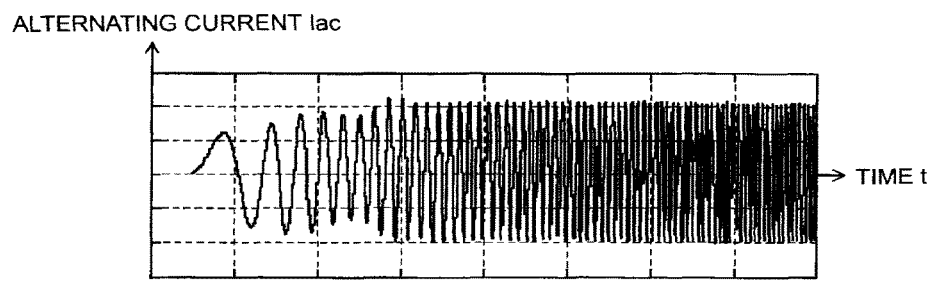
FIG. 14 is a diagram of an actual measurement waveform example of an alternating current when a high-speed sinusoidal sweeping method is used in an excitation actual measurement procedure during the local value derivation step.
Figure 15:
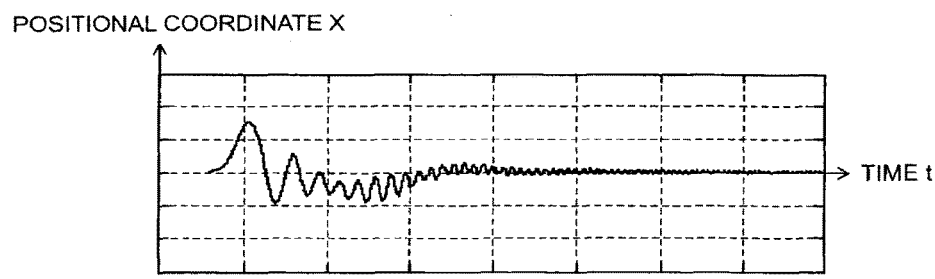
FIG. 15 is a diagram of an actual measurement waveform example of a positional coordinate of the moving body corresponding to the alternating current of FIG. 14 in the excitation actual measurement procedure.

FIG. 14 is a diagram of an actual measurement waveform example of the alternating current Iac when the high-speed sinusoidal sweeping method is used in the excitation actual measurement procedure J12 during the local value derivation step S2. FIG. 15 is a diagram of an actual measurement waveform example of the positional coordinate X of the moving body 4 corresponding to the alternating current Iac of FIG. 14 in the excitation actual measurement procedure J12. In FIGS. 14 and 15, the actual measurement is performed using a common sweeping period. In the waveform of the alternating current Iac illustrated in FIG. 14, the frequency f gradually increases with the passage of time, and the amplitude of the waveform is substantially fixed except for an initial low frequency region. Corresponding to this, as illustrated in FIG. 15, the oscillatory waveform of the positional coordinate X of the moving body 4 is subjected to actual measurement. The oscillatory waveform indicates that the moving body 4 is excited forward and backward in the movement direction to perform minute vibrations.

In the next transfer function derivation procedure J13, a transfer function of the frequency domain G(f) is derived based on the chronological change in the alternating current Iac and the chronological change in the positional coordinate X of the moving body 4. In the first embodiment, as a precondition, it is confirmed that the wavelength of the alternating current Iac of the high-speed sinusoidal sweeping method illustrated in FIG. 14 is not erroneous. Upon confirmation, the chronological change in the positional coordinate X of the moving body 4 illustrated in FIG. 15 is subjected to a Fourier transformation to derive the transfer function of the frequency domain G(f). Although a gain function and a phase function are obtained as the transfer function G(f) by the Fourier transformation, only the gain function is used. The gain function represents the characteristics of the amplitude of the minute vibrations of the moving body 4 depending on the frequency f.

Figure 16:
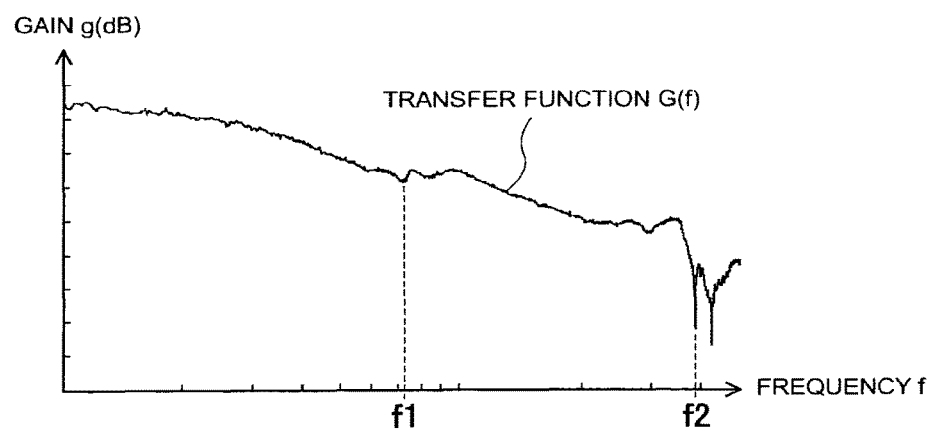
FIG. 16 is a diagram exemplifying a transfer function of a frequency domain which is derived in a transfer function derivation procedure during the local value derivation step.

FIG. 16 is a diagram exemplifying the transfer function of the frequency domain G(f) which is derived in the transfer function derivation procedure J13 during the local value derivation step S2. In FIG. 16, the horizontal axis indicates the frequency f, and the vertical axis indicates a gain g (a digital value). The gain g decreases substantially smoothly in accordance with an increase of the frequency f, and the decreasing tendency slows down in the frequency band from a certain frequency f1 which is comparatively high to a frequency f2.

In the next model calibration procedure J14, a modeled mass M of the moving body is estimated by calibrating the physical model in which the mass M of the moving body 4 and the friction conditions during movement are variably modeled using the transfer function of the frequency domain G(f). A model which uses the Laplace transform technique which is represented by the following equation is used as the physical model. Modeled transfer function $Gm(s)=(X/F)=1/(Ms^2+Ds+K)$ Where a Laplace operator s, the positional coordinate X, the thrust F, the modeled mass M, a numerical constant D representing a component of the friction resistance R which is proportional to the velocity V, and a numerical constant K representing a fixed component of the friction resistance R which is unrelated to the velocity V. The nonlinearity of the friction resistance R is modeled by the numerical constant D and the numerical constant K.

Figure 17:
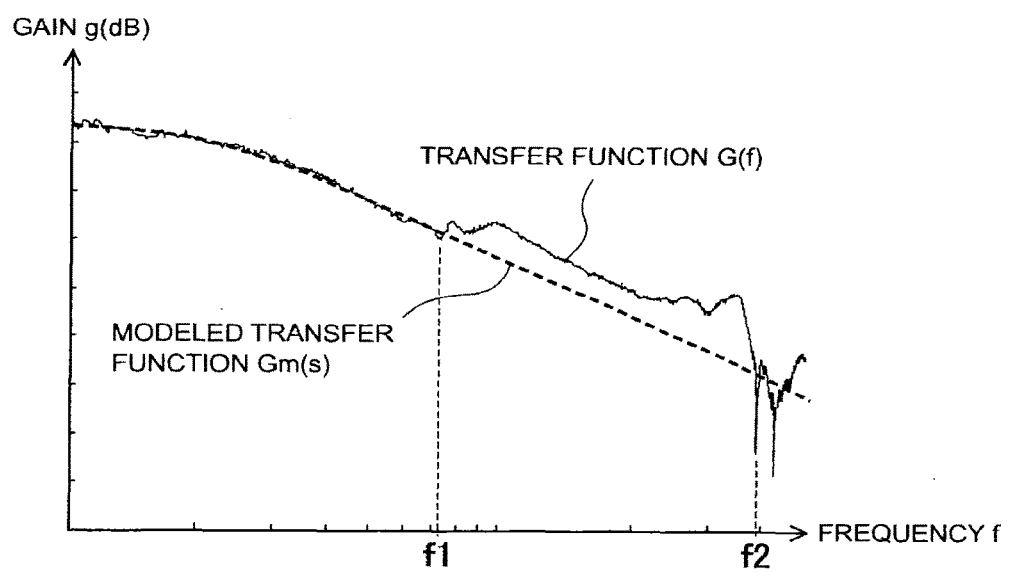
FIG. 17 is a diagram illustrating an example of a transfer function which is calibrated in a model calibration procedure during the local value derivation step.

Here, it is possible to calibrate the modeled transfer function Gm(s) using the derived transfer function G(f) by variably adjusting the mass M, the numerical constant D, and the numerical constant K. FIG. 17 is a diagram illustrating an example of the transfer function Gm(s) which is calibrated in the model calibration procedure J14 during the local value derivation step S2. In FIG. 17, the modeled transfer function Gm(s) is illustrated using a dashed line, and is calibrated to the transfer function G(f). At this time, it is important to match the two transfer function Gm(s) and the transfer function G(f) well in the low frequency band which is equal to or less than the frequency f1 in which the gain g is large. A certain degree of separation is allowed in the frequency band of the frequency f1 to the frequency f2 in which the gain g is small. Accordingly, the modeled mass M is determined.

In the next local value calculation procedure J15, a correction scaling factor C1 is obtained by dividing an actual measurement mass M0 or a design mass M0 of the moving body 4 by the modeled mass M. Here, since the actual mass of the moving body 4 is naturally unchanging, the modeled mass M being smaller than the actual measurement mass M0 means that the actual measurement obtains a larger movement amount than the design value. In other words, this means that the thrust F and the local thrust constant N1 are greater than the design values. Conversely, the modeled mass M being greater than the actual measurement mass M0 means that the actual measurement obtains a smaller movement amount than the design value. In other words, this means that the thrust F and the local thrust constant N1 are smaller than the design values. Therefore, the concept of the correction scaling factor C1 is justified. It is possible to calculate the local thrust constant N1 of the positional coordinate X1 by multiplying the correction scaling factor C1 with a design value Ndn of the thrust constant.

In the next procedure J16, it is determined whether or not the actual measurement location is the final actual measurement location, and if not, the process transitions to the next actual measurement location and returns to the excitation actual measurement procedure J12. In the example of FIG. 13, the procedures from the excitation actual measurement procedure J12 to the procedure J16 are repeated at the six locations of the positional coordinates X1 to X6. Accordingly, for each of the positional coordinates X1 to X6, it is possible to calculate the correction scaling factors C1 to C6 and the local thrust constants N1 to N6, respectively. In the procedure J16, when the actual measurement location is the final actual measurement location, the local value derivation step S2 is ended.

In the excitation actual measurement procedure J12, it is possible to use a method other than the high-speed sinusoidal sweeping method. For example, the frequency f of the alternating current Iac is changed stepwise by the step sweeping method, and actual measurement may be performed of the amplitude of the minute vibrations of the moving body 4 at each frequency f. In this case, in the transfer function derivation procedure J13, instead of the Fourier transformation, the relationship between the frequency f and the amplitude of the minute vibrations is obtained. In addition, it is possible to appropriately modify the local value derivation step S2.

It is possible to use the movement control method of the linear motor of the second embodiment for the thrust constant N(X) of the arbitrary positional coordinate X on the track member 2 which is derived in the first embodiment. The thrust constant derivation method of the linear motor of the first embodiment is not limited thereto, and it is possible to adapt to a product testing method when manufacturing the linear motor 1. Specifically, for example, it is possible to determine the acceptability of the performance of the linear motor 1 by providing a limit determination value in the variation range of the thrust constant N(X) which is derived using actual measurement.

A thrust constant derivation method of a linear motor of the first embodiment is a method of deriving the thrust constant N representing an occurrence rate of the thrust F in relation to the current I in the linear motor 1 which is provided with the track member 2 which includes the permanent magnets 3 extending in a movement direction, and the moving body 4 which includes the coils 5 mounted to the track member 2 in a movable manner, the linear motor 1 generating the thrust F in the movement direction between the permanent magnets 3 and the coils 5 by causing the current I to flow in the coils 5, in which the method derives the average thrust constant Nav1 which is an average thrust constant in a long movement zone on the track member 2 based on actual measurement, derives the local thrust constants N1 to N6 which are local thrust constants of a plurality of locations (the positional coordinates X1 to X6) on the track member 2 based on each actual measurement, and derives the thrust constant N(X) of an arbitrary position (the positional coordinate X) on the track member 2 based on the average thrust constant Nav1 and the local thrust constant N1 to N6 of each location.

Accordingly, by performing the actual measurement under a plurality of actual measurement conditions, it is possible to derive the average thrust constant Nav1 in the long movement zone on the track member 2, and it is possible to derive the local thrust constants N1 to N6 at each of the plurality of locations on the track member 2. It is possible to quantitatively ascertain the friction resistance R between the moving body 4 and the track member 2 by comparing the average thrust constant Nav1 and the local thrust constants N1 to N6 to each other and it is possible to reduce the influence thereof. Therefore, it is possible to increase the derivation precision of the thrust constant N(X) of an arbitrary position (the positional coordinate X) on the track member 2 based on the average thrust constant Nav1 and the local thrust constants N1 to N6 of the each of the locations which are derived by the plurality of actual measurements in comparison with the related art which is based on a single actual measurement condition.

There is a thrust constant derivation method of a linear motor of the first embodiment, the method including the average value derivation step S1 of moving the moving body 2 along the long movement zone on the track member 2 and deriving the average thrust constant Nav1, the local value derivation step S2 of causing the moving body 2 to perform micro-movements in the movement direction at a plurality of locations on the track member 2 and deriving each of the local thrust constants N1 to N6 at each location, the local value correction step S3 of calculating the difference ΔN between the average value Nav2 of the local thrust constants N1 to N6 of the locations and the average thrust constant Nav1 and correcting the local thrust constants N1 to N6 of each location by the difference ΔN to obtain a corrected thrust constants N1c to N6c of each location, and the interpolation derivation step S4 of deriving the thrust constant N(X) of an arbitrary position (the positional coordinate X) on the track member 2 by interpolating the corrected thrust constants N1c to N6c of the locations.

Accordingly, since the difference ΔN between the average thrust constant Nav1 from which the influence of the friction resistance R is removed and the average value Nav2 of the local thrust constants N1 to N6 of the locations which receive the influence of the friction resistance R is calculated, it is possible to reliably reduce the influence of the friction resistance R. Accordingly, it is possible to increase the derivation precision of the thrust constant N(X) by a greater amount than in the related art.

In the thrust constant derivation method of the linear motor of the first embodiment, the following procedures are performed at a plurality of locations (the positional coordinates X1 to X6) on the track member 2, the local value derivation step S2 includes the excitation actual measurement procedure J12 of actually measuring the alternating current Iac and positional information (the positional coordinate X) of the moving body 4 while causing the variable frequency alternating current Iac to flow in the coils 5 and exciting the moving body 4 forward and backward in the movement direction, the transfer function derivation procedure J13 of deriving the transfer function of a frequency domain G(f) based on chronological change in the alternating current Iac and chronological change in the positional information (the positional coordinate X) of the moving body 4, the model calibration procedure J14 of estimating the modeled mass M of the moving body 4 by calibrating a physical model in which the mass M of the moving body 4 and friction conditions (the numerical constant D and the numerical constant K) during movement are variably modeled using the transfer function of the frequency domain G(f), and the local value calculation procedure J15 of obtaining the correction scaling factors C1 to C6 by dividing the actual measurement mass M0 or the design mass M0 of the moving body 4 by the modeled mass M of the moving body 4, and calculating the local thrust constants N1 to N6 by multiplying the correction scaling factors C1 to C6 by the design value Ndn of the thrust constant.

Accordingly, even if there are change factors such as individual differences in strength and size of the permanent magnets 3 and variation in the arrangement positions of the permanent magnets 3 which are provided to line up, it is possible to precisely derive the local thrust constants N1 to N6 of each of the locations (the positional coordinates X1 to X6) on the track member 2.

In the thrust constant derivation method of the linear motor of the first embodiment, in the excitation actual measurement procedure J12, a sinusoidal current is used for the alternating current Iac to be caused to flow in the coils 5, and a high-speed sinusoidal sweeping method which gradually changes the frequency f chronologically is used, and, in the transfer function derivation procedure J13, the chronological change in the positional information (the positional coordinate X) of the moving body 4 is subjected to a Fourier transformation to derive the transfer function of the frequency domain G(f).

Accordingly, it is possible to efficiently derive the local thrust constants N1 to N6 in a short time by using the high-speed sinusoidal sweeping method.

In the thrust constant derivation method of the linear motor of the first embodiment, the average value derivation step S1 includes the fixed velocity actual measurement procedure J1 of moving the moving body 4 across the movement zone at a fixed velocity, performing actual measurement of the friction compensation currents If1 to Ifn necessary in compensation of the friction resistance R at a plurality of velocities V1 to Vn, and storing a friction compensation table in which the velocities V1 to Vn are correlated with the friction compensation currents If1 to Ifn, the fixed acceleration actual measurement procedure J2 of moving the moving body 4 across the movement zone at the fixed acceleration A and deceleration −A and actually measuring the acceleration required current Ia which is necessary at the time and the velocity V of the moving body 4, and the average value calculation procedure J3 of calculating the average thrust constant Nav1 based on the acceleration net current Im which is obtained by acquiring the friction compensation current If corresponding to the velocity V of the moving body 4 which is actually measured in the fixed acceleration actual measurement procedure J2 from the friction compensation table and subtracting the acquired friction compensation current If from the acceleration required current Ia.

Accordingly, even if the friction resistance R is nonlinearly changed in relation to the velocity V, it is possible to derive the average thrust constant Nav1 from which the influence of the change is removed with extremely high precision. Therefore, it is possible to further increase the derivation precision of the thrust constant N(X).

In the thrust constant derivation method of the linear motor of the first embodiment, a plurality of the coils 5 are provided to line up in an area of the predetermined length LM in the movement direction of the moving body 4, and a plurality of locations (the positional coordinates X1 to X6) on the track member 2 at which to derive the local thrust constants N1 to N6 are set at the interval LD which is narrower than the predetermined length LM.

Accordingly, since the influence of the change factors of all of the permanent magnets 3 is reflected on at least one of the local thrust constants N1 to N6 and no blind spots arise, it possible to further increase the derivation precision of the thrust constant N(X).

Figure 18:
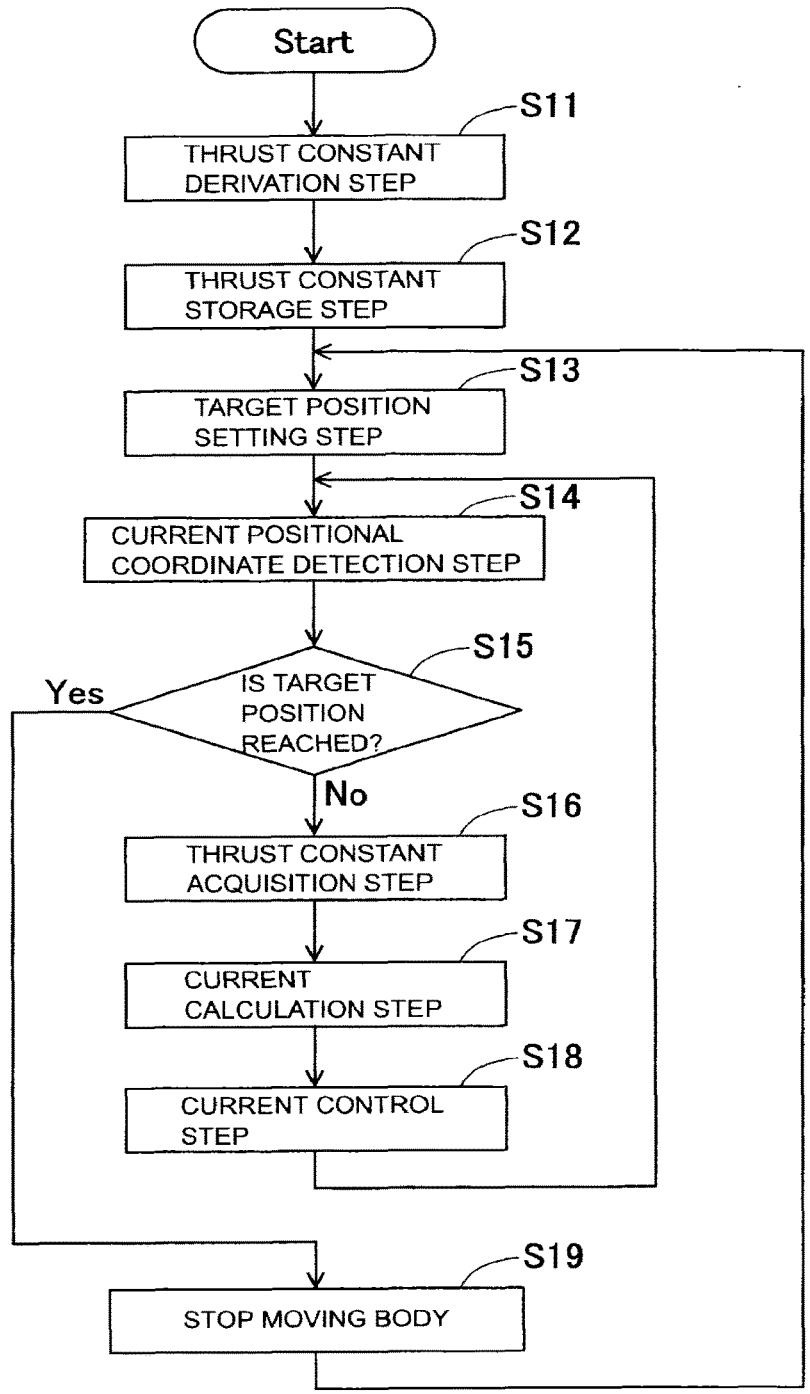
FIG. 18 is a flowchart illustrating a movement control method of a linear motor of a second embodiment.

Next, description will be given of the movement control method of the linear motor of the second embodiment, with reference to FIG. 18. In the second embodiment, the movement control is performed using the moving body 4 of the linear motor 1 which is the same as in the first embodiment as the control target. FIG. 18 is a flowchart illustrating the movement control method of the linear motor of the second embodiment. The calculation process and control based on this flowchart are mainly managed by the movement control section which is installed in the moving body 4.

In a thrust constant derivation step S11, the thrust constant derivation method of the linear motor of the first embodiment is performed, and the thrust constant N(X) of the arbitrary positional coordinate X on the track member 2 is derived. In a next thrust constant storage step S12, a thrust constant table in which the thrust constant N(X) is correlated with the positional coordinate X is stored in a memory or the like. The thrust constant derivation step S11 and the thrust constant storage step S12 are performed only in limited cases such as directly after the manufacture of the linear motor 1, during repairs, during regular inspection, and the like. In contrast, a target position setting step S13 onward are always performed repeatedly during the usage of the linear motor 1.

In the target position setting step S13, a target positional coordinate Xtgt to which the moving body 4 is to be moved is set. The target positional coordinate Xtgt may be instructed from outside, and may be determined by the movement control section using a calculation process. In a next current positional coordinate detection step S14, the movement control section acquires information of the current positional coordinate Xnow of the moving body 4 from the position detection section. In a next step S15, it is determined whether or not the moving body 4 has reached the target positional coordinate Xtgt, that is, whether or not current positional coordinate Xnow=target positional coordinate Xtgt is satisfied. Directly after setting the target positional coordinate Xtgt, the conditions of step S15 ordinarily are not satisfied, and the process proceeds to a thrust constant acquisition step S16.

In the thrust constant acquisition step S16, the thrust constant N(Xnow) corresponding to the current positional coordinate Xnow of the thrust constant table is acquired. In a next current calculation step S17, the magnitude of a current Inow flowing in the coil 5 is calculated. It is possible to perform this calculation by adapting, as appropriate, a well-known technique in which the target positional coordinate Xtgt, the current positional coordinate Xnow, and the thrust constant N(Xnow) are used as calculation parameters. In a next current control step S18, control is performed to allow the calculated current Inow to actually flow. Subsequently, the process returns to the current positional coordinate detection step S14.

In the current positional coordinate detection step S14 of the second time onward, the movement control section acquires the information of the current positional coordinate Xnow again, and in step S15, the movement control section determines whether or not current positional coordinate Xnow=target positional coordinate Xtgt is satisfied. While the condition of step S15 is not satisfied, the movement control section repeatedly performs from the current positional coordinate detection step S14 to the current control step S18 in a loop. When the moving body 4 reaches the target positional coordinate Xtgt, the process proceeds from step S15 to step S19, and the moving body 4 is stopped. Next, when it becomes necessary to move the moving body 4, the process returns to the target position setting step S13, and from then on repeats the same movement control. From the current positional coordinate detection step S14 to the current control step S18 corresponds to the thrust control step of the present disclosure.

A movement control method of a linear motor of the second embodiment includes a thrust constant storage step of storing a thrust constant table in which the thrust constant N(X) is correlated with the positional coordinate X of the arbitrary positional coordinate X on the track member 2 which is derived using the thrust constant derivation method of the linear motor according to the first embodiment, and a thrust control step of detecting the current positional coordinate Xnow on the track member 2 of the moving body 4 when subjecting the moving body 4 to movement control, and using the thrust constant N(Xnow) corresponding to the current positional coordinate Xnow of the thrust constant table to control the current Inow to be caused to flow in the coil 5.

Accordingly, the thrust constant N(X) which has higher precision than the related art is stored in the thrust constant table, and it is possible to perform the movement control using the thrust constant N (Xnow) corresponding to the current positional coordinate Xnow of the moving body 4. Therefore, it is possible to increase the precision of the movement control of the moving body 4 more than the related art.

It is possible to carry out both the thrust constant derivation method of the linear motor of the first embodiment and the movement control method of the linear motor of the second embodiment as devices. The effects of a case in which the embodiments are carried out as devices are the same as the first and second embodiments. It is possible to apply various other adaptations and modifications to the present disclosure.

REFERENCE SIGNS LIST

1: linear motor, 2: track member, 21, 22: long rail, 3, 31, 32, 33, 35: permanent magnet, 4: moving body, 5: coil, G, G1 to G8: gap length, X, X1 to X6: positional coordinate, LM: predetermined length, LD: interval, N, N(X): thrust constant, Nav1: average thrust constant, N1 to N6: local thrust constant, Nav2: average value of local thrust constants, ΔN: difference, N1c to N6c: corrected thrust constant, V: velocity, If: friction compensation current, Ia: acceleration required current, Im: acceleration net current, G(f): transfer function of frequency domain, Gm(s): modeled transfer function

The invention claimed is:

1. A thrust constant derivation method of a linear motor for deriving a thrust constant representing an occurrence rate of a thrust in relation to a current in the linear motor which is provided with a track member, which includes one of a magnet and a coil extending in a movement direction, and a moving body, which includes the other of the magnet and the coil mounted to the track member in a movable manner, the linear motor generating a thrust in the movement direction between the magnet and the coil by causing a current to flow in the coil, the method comprising:

causing the moving body to move along a long movement zone on the track member, the long movement zone including a plurality of locations on the track member;

deriving a first thrust constant in the long movement zone on the track member based on actual measurements of current as the moving body moves across the long movement zone;

causing the moving body to perform movements in the movement direction at each of the plurality of locations;

deriving second thrust constants of the plurality of locations on the track member based on an actual measurement of an alternating current and positional information at each of the plurality of locations; and deriving the thrust constant, of an arbitrary position on the track member including a position between two of the plurality of locations on the track member, based on the first thrust constant and the second thrust constants.

2. The thrust constant derivation method of a linear motor according to claim 1, wherein causing the moving body to perform the movements in the movement direction includes causing the moving body to perform micro-movements in the movement direction, and the method further comprises:

calculating a difference between an average value of the second thrust constants and the first thrust constant;

correcting the second thrust constant of each of the plurality of locations by the difference to obtain a corrected second thrust constant of each of the plurality of locations; and deriving the thrust constant, of the arbitrary position on the track member, by interpolating the corrected second thrust constants.

3. The thrust constant derivation method of a linear motor according to claim 2, the method further comprising:

performing, at the plurality of locations on the track member, the following:

actually measuring the alternating current and the positional information of the moving body while causing a variable frequency alternating current to flow in the coil and exciting the moving body forward and backward in the movement direction;

deriving a transfer function of a frequency domain based on a chronological change in the alternating current and a chronological change in the positional information of the moving body;

estimating a modeled mass of the moving body by calibrating a physical model in which the mass of the moving body and friction conditions during movement are variably modeled using the transfer function of the frequency domain;

obtaining a correction scaling factor by dividing an actual measurement mass or a design mass of the moving body by the modeled mass of the moving body; and calculating the second thrust constant of each of the plurality of locations by multiplying the correction scaling factor by a design value of the thrust constant.

4. The thrust constant derivation method of a linear motor according to claim 3, the method further comprising:

using a sinusoidal current for the variable frequency alternating current;

gradually changing the variable frequency chronologically using a high-speed sinusoidal sweeping method; and subjecting the chronological change in the positional information of the moving body to a Fourier transformation to derive the transfer function of the frequency domain.

5. The thrust constant derivation method of a linear motor according to claim 2, the method further comprising:

moving the moving body across the long movement zone at a fixed velocity;

performing an actual measurement of a friction compensation current necessary in compensation of a friction resistance at a plurality of velocities;

storing a friction compensation table in which a velocity is correlated with a corresponding friction compensation current;

moving the moving body across the long movement zone at a fixed acceleration;

actually measuring an acceleration required current and a velocity of the moving body which are necessary at the time; and calculating the first thrust constant based on an acceleration net current which is obtained by acquiring the friction compensation current corresponding to the velocity of the moving body which is actually measured from the friction compensation table and subtracting the acquired friction compensation current from the acceleration required current.

6. The thrust constant derivation method of a linear motor according to claim 1, wherein a plurality of magnets or coils are provided to line up in an area of a predetermined length in the movement direction of the moving body, and the plurality of locations on the track member, at which the second thrust constants are derived, are set at an interval which is narrower than the predetermined length.

7. A movement control method of a linear motor, the method comprising:

storing a thrust constant table in which the thrust constant, of the arbitrary position on the track member, which is derived using the thrust constant derivation method of a linear motor device according to claim 1 is correlated with a positional coordinate of the arbitrary position on the track member;

detecting a current positional coordinate on the track member of the moving body when the moving body is subjected to movement control; and using a thrust constant corresponding to the current positional coordinate of the thrust constant table to control a current to be caused to flow in the coil.

8. A movement control device of a linear motor, the device comprising:

storage for storing a thrust constant table in which the thrust constant, of the arbitrary position on the track member, is derived using the thrust constant derivation method of the linear motor according to claim 1 is correlated with a positional coordinate of the arbitrary position on the track member; and a controller configured to detect a current positional coordinate on the track member of the moving body when the moving body is subjected to movement control, and use a thrust constant corresponding to the current positional coordinate of the thrust constant table to control a current to be caused to flow in the coil.

9. A thrust constant derivation device which derives a thrust constant representing an occurrence rate of a thrust in relation to a current in linear motor which is provided with a track member, which includes one of a magnet and a coil extending in a movement direction, and a moving body, which includes the other of the magnet and the coil mounted to the track member in a movable manner, the linear motor generating the thrust in the movement direction between the magnet and the coil by causing the current to flow in the coil, the device comprising:

a processing device programmed to cause the moving body to move along a long movement zone on the track member, the long movement zone including a plurality of locations on the track member;

derive a first thrust constant in a long movement zone on the track member based on actual measurement of current as the moving body moves across the long movement zone;

cause the moving body to perform movements in the movement direction at each of the plurality of locations;

derive second thrust constants of the plurality of locations on the track member based on actual measurement of an alternating current and positional information at each of the plurality of locations; and derive the thrust constant, of an arbitrary position on the track member including a position between two of the plurality of locations on the track member, based on the first thrust constant and the second thrust constants.

* * * * *